(No Model.)

D. H. ERDMAN.
WATER FILTER.

No. 539,892.  Patented May 28, 1895.

Witnesses
Wm S. Hoffman
John L. Semple

Inventor
Daniel H. Erdman
by Francis D. Pastorius
Attorney

THE NORRIS PETERS CO., PHOTO-LITHO., WASHINGTON, D. C.

UNITED STATES PATENT OFFICE.

DANIEL H. ERDMAN, OF CAMDEN, NEW JERSEY.

WATER-FILTER.

SPECIFICATION forming part of Letters Patent No. 539,892, dated May 28, 1895.

Application filed September 25, 1893. Serial No. 486,433. (No model.)

*To all whom it may concern:*

Figure 1:
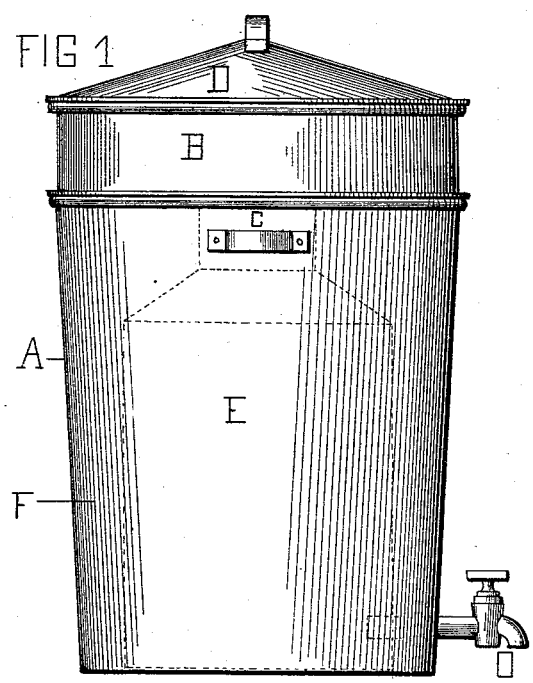
Figure 2:
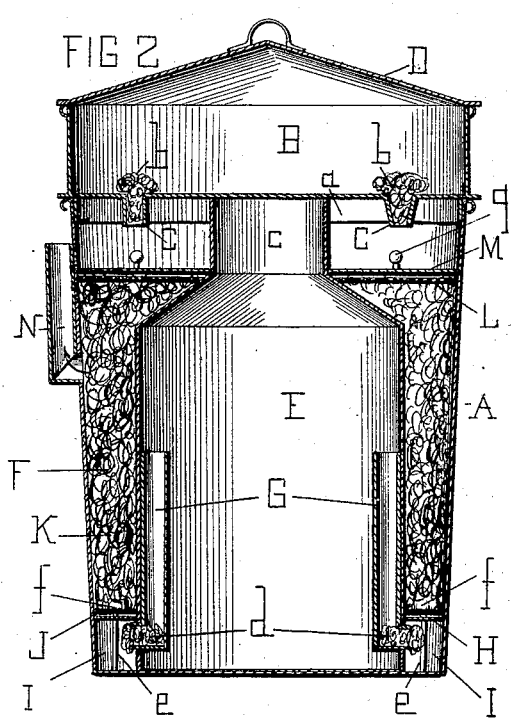
Figure 3:
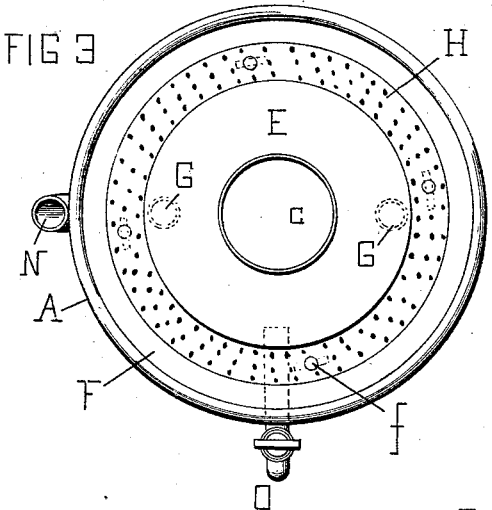
Figure 4:
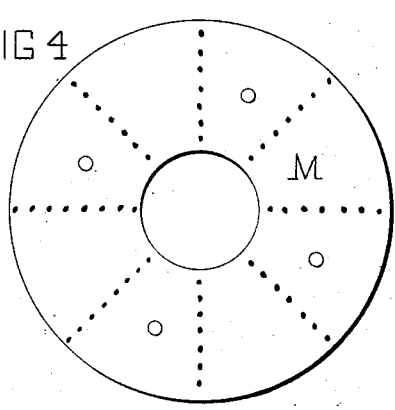

Be it known that I, DANIEL H. ERDMAN, a citizen of the United States, residing at Camden, in the county of Camden and State of New Jersey, have invented certain new and useful Improvements in Water-Filters; and I do declare the following to be a full, clear, and exact description of the invention, such as will enable others skilled in the art to which it appertains to make and use the same, reference being had to the accompanying drawings, and to the letters of reference marked thereon, which form a part of this specification.
The invention is designed for clearing and purifying water by filtration, particularly for household use. It consists in an upright filter composed of an outer chamber or casing of any shape, a removable water-settling pan forming the top of the casing, and a filtered-water chamber arranged within the casing to form an annular chamber between them, which is packed with charcoal resting on a perforated false-bottom raised above the bottom of the annular chamber, thereby making a drip chamber which communicates with the filtered-water chamber by means of pipes packed with sponges or other suitable filters. The charcoal is overlaid with a canvas or cloth percolator on which bears a heavy perforated-ring for weighting and keeping the charcoal packed down. A stop cock extends from without the casing to within the filtered-water chamber for drawing the water, and a vertical sight-pipe is applied to the outside of the casing, its ends open, respectively, to the annular space and outer air, for observing the level of the water in the annular space.
On reference to the accompanying sheet of drawings, making part of this specification, Figure 1 is a surface elevation of the filter. Fig. 2 is a diametrical and vertical section. Fig. 3 is a plan view of the filter, the settling-pan, strainer-ring, canvas or cloth percolator, and charcoal being removed to show the interior and false bottom. Fig. 4 is a plan view of the top perforated ring or strainer, and Fig. 5 is a diametrical and vertical section of the settling-pan.

Similar letters refer to similar parts in the several views.

The filter is composed of an upright outer-chamber or casing A, which is sloping of a curved form or other suitable shape.

Figure 5:
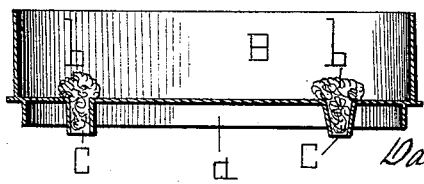

B is a removable settling-pan whose flange, *a*, Fig. 5, engages with the casing making a cover or top for it.

C represents depending spouts, of the settling pan, packed with sponges or other filtering material, *b*, for slowing and percolating the unfiltered water poured into said pan, and D its lid.

E is an upright filtered-water chamber placed within the casing A to form an annular space F between them. Its top end is conical and has a reduced part or neck, *c*, which if desired can abut the bottom of the settling pan B for a cover. It communicates with the annular space F by means of its interior and vertical pipes G which open into said annular space above its bottom, straining sponges or filters, *d*, being packed into the openings.

H, Figs. 2 and 3, is a perforated false-bottom or ring removably adjusted in the annular space F around the filtered-water chamber E, and supported above its bottom by vertical legs, *e*, to form a drip chamber I. It is provided with lifting eyes, *f*, and has an overlaying canvas or cloth-ring percolator J.

K is a filter and purifier of charcoal, broken to a proper size, and packed in the annular space F on the false bottom H.

L is a top canvas or cloth-ring percolator held in place on the charcoal by a heavy perforated-ring and strainer M, which also serves to weight and pack down said charcoal, being lifted by its eyes, *g*.

N is a vertical sight-tube on the outside of the casing. Its ends open, respectively, into the annular space F and the open air, for observing the level of the water in said annular space, and O is a stop cock extending from the outside to the filtered-water chamber E, for drawing the purified water.

On water being poured into the settling pan B, it is gradually and slowly strained through the slowing sponges or filtering material, *b*, and spouts C, and drops into and through the weighted perforated-ring M, after which it percolates through the top cloth-ring L which percolates it, while the heavy perforated-ring M weighs down and packs the charcoal K in the annular space on the perforated false bottom H. After leaving the percolating cloth-ring L, the water is filtered and purified in its dripping through the charcoal, when it is again percolated and strained in its passage through the percolating cloth-ring J and the perforated false-bottom H into the chamber or bottom-space I, thence through the filtering-material or sponges, $d$, and pipes G to the filtered-water chamber E. The straining, percolating, and purifying, and consequent slowing of the water for that purpose, is completed when the water reaches the cloth-ring J and false-bottom H. They together with the sponges, $d$, merely catch very fine sediments and particles of charcoal, and render the water perfectly clear and limpid. The filter is cleaned at intervals by removing the settling pan B, cloth ring L, and strainer M, after which it is upturned and the charcoal K, false bottom H, and cloth ring J dumped out, the sloping curved-form of the casing A and annular space F, facilitates the same. The remaining part of the cleaning is easily accomplished by running water through it.

I claim—

1. In a filter of the character described, the combination with a casing, a concentric receptacle therein forming a chamber to receive the filtering agent and a perforated false-bottom in the filtering chamber, of the percolating cloth rings arranged at top and bottom of the filtering chamber to confine the filtering agent between themselves, and a perforated weight-ring fitted around the receptacle and bearing upon the upper percolating ring and serving to hold the filtering agent in a compact mass between the percolating cloth rings, substantially as described.

2. In a filter of the character described, the combination with a casing of an internal receptacle forming a filtered water chamber and arranged concentrically within said casing to form an annular space designed to receive the filtering agent, a perforated false bottom around the lower part of the internal receptacle and in the annular space between said receptacle and casing, a percolating cloth ring resting upon the false bottom, the pipes G within the internal receptacle and having their lower ends opening into the drip chamber provided between the false bottom and the bottom of the casing, an upper cloth ring designed to be fitted upon the filtering agent in the space between the casing and internal receptacle, and a perforated weighted ring which bears upon the upper percolating ring, substantially as described.

3. In a filter, the combination with an internal casing, of a settling pan supported upon the upper end of the casing and having an imperforate bottom and the vertical packed tubes, an internal receptacle forming a filtered water chamber, provided in its upper end with a contracted neck $c$ which bears against the imperforate bottom of the settling pan, the percolating cloth ring L fitted around the neck of the internal receptacle and adapted to bear upon the filtering agent in the space between the casing and said receptacle, and a perforated weighted ring M also fitted around the neck of the receptacle and bearing upon the upper percolating ring, substantially as and for the purposes described.

In testimony whereof I affix my signature in presence of two witnesses.

DANIEL H. ERDMAN.

Witnesses:
FRANCIS D. PASTORIUS,
JAMES M. CASSADY.